Feb. 27, 1968   B. E. STEELY   3,370,340
TOOL ASSEMBLY
Filed June 17, 1965   2 Sheets-Sheet 1
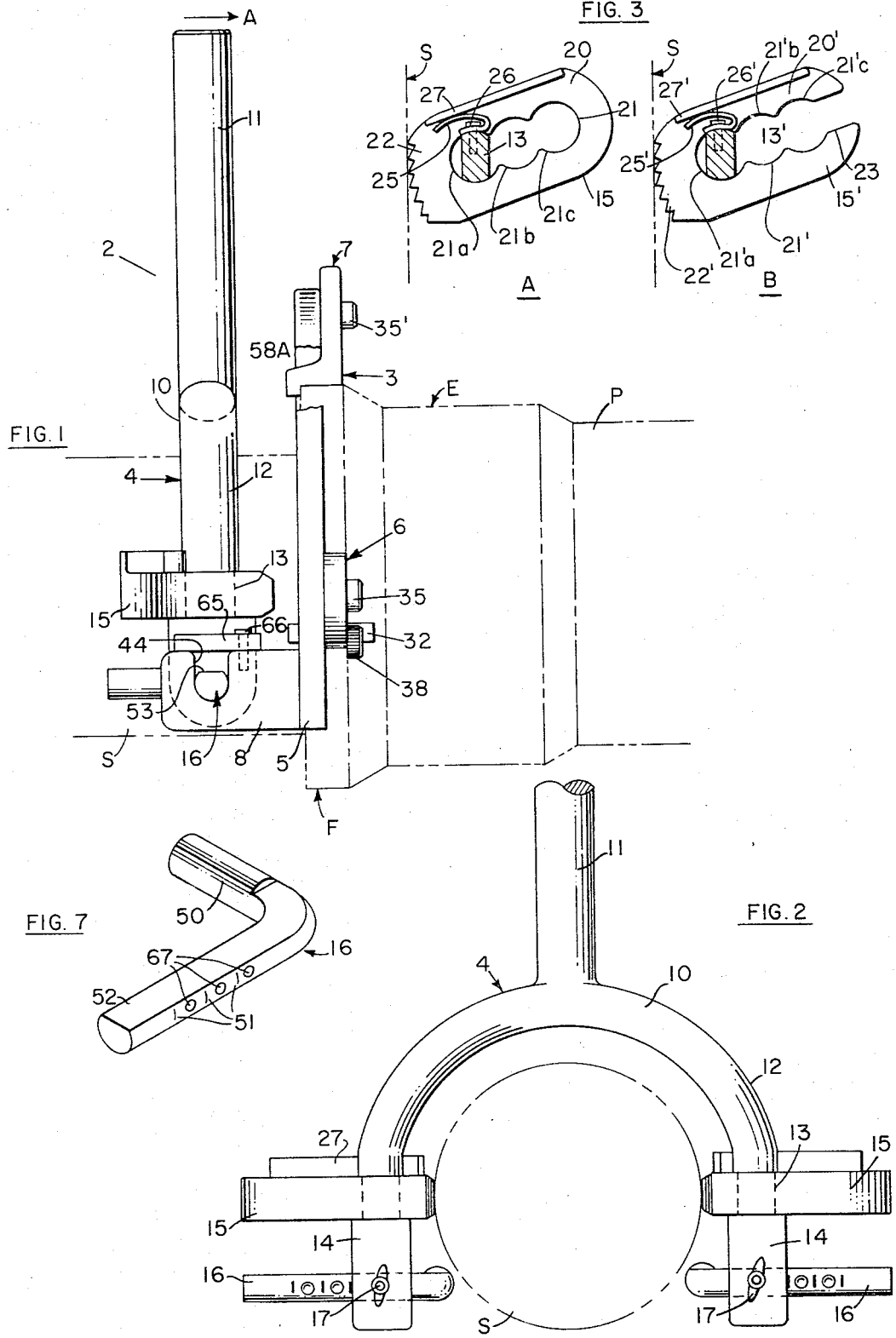

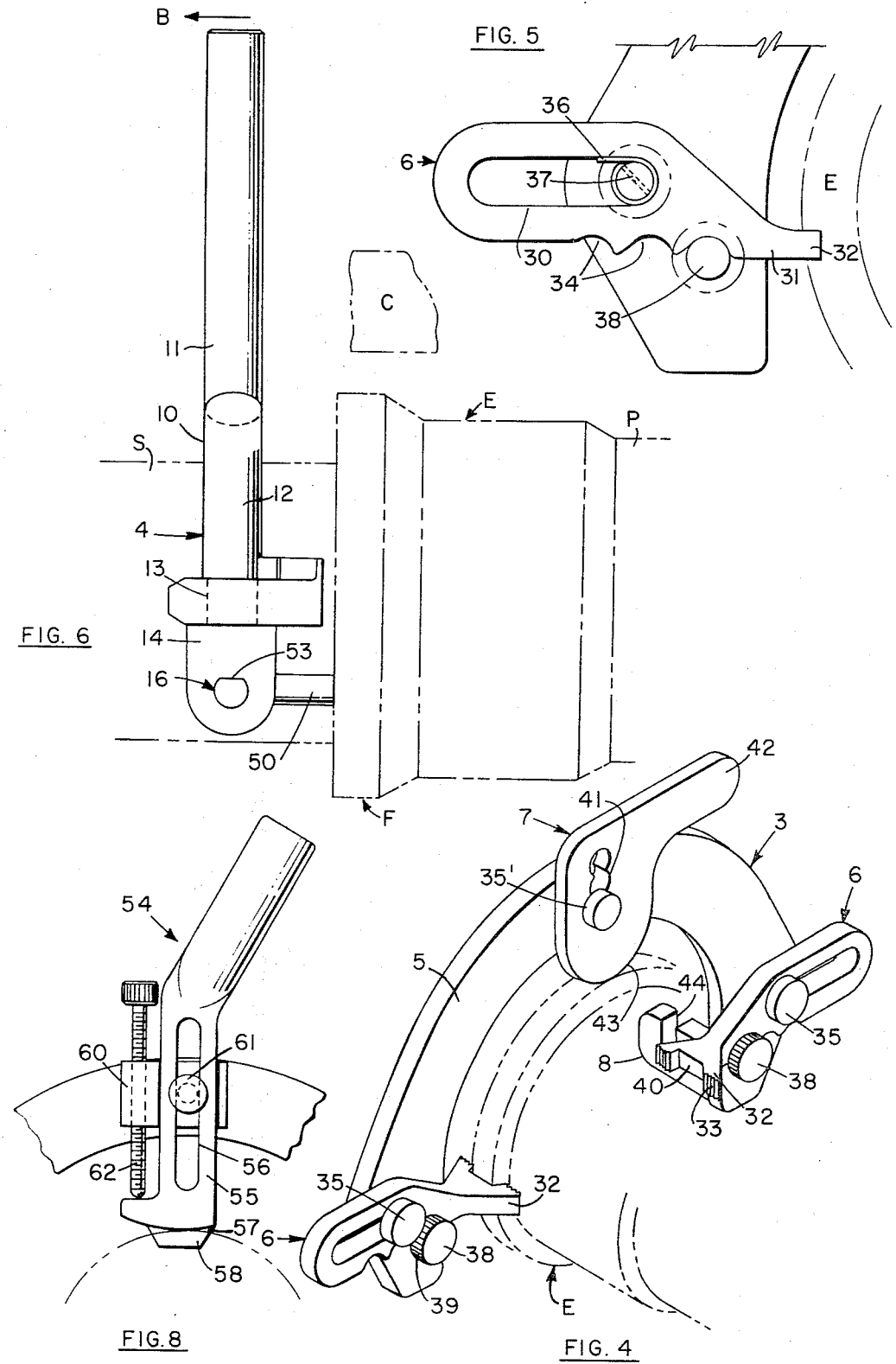

United States Patent Office 3,370,340
Patented Feb. 27, 1968

3,370,340
TOOL ASSEMBLY
Beauford E. Steely, 5831 Velasco St.,
Dallas, Tex. 75206
Continuation-in-part of application Ser. No. 457,334,
May 20, 1965. This application June 17, 1965, Ser.
No. 464,810
4 Claims. (Cl. 29—237)

ABSTRACT OF THE DISCLOSURE

This invention is a tool for use by plumbers and provides a means for assembling threadless pipe of the type often having an end bell and spigot and adapted to be forceably joined through an intermediate flexible sealing gasket. The necessary force to join the spigot of one pipe to the bell of another pipe may be applied through an elongated lever which terminates in a yoke that is pivoted to another yoke adjacent the joint.

---

This application is a continuation-in-part of a prior copending application of the same inventor filed May 20, 1965, Ser. No. 457,334, for Plumbing Tool, now abandoned.

The prior application disclosed in one instance the concept of utilizing a stationary member on the end bell of one section of a threadless pipe joint and utilizing a ratchet-acting force applying member on the other section of the pipe joint to forceably join the two sections. The present invention discloses substantial improvements in the structural application of the important concepts disclosed in the prior application, which is incorporated in this specification by reference thereto.

A primary object of this invention is to provide an improved tool for joining sections of threadless pipe including pipe joints formed thereon.

Another object is to provide an extremely simple and light weight pipe joining tool that is very effective for the purpose for which it is intended.

A further object is to provide a tool of the character described that is of greatly reduced dimensions compared to tools of the prior art and is particularly thin in the axial direction of the pipe being joined so that the tool may be inserted between two very short length sections of pipe or special joints therefor.

And another object is to provide a simple, easy to operate, and yet fool-proof tool that is usable on a wide range of pipe sizes, and wherein the tool is entirely hand operated without requiring the use of auxiliary tools.

One type of pipe for which the tool of this invention is particularly suited is cast-iron pipe having an end bell at one end and a spigot at the other, and wherein a rubber-like gasket is inserted between one spigot and the co-operating end bell of the next adjacent pipe section. The spigot and end bell are joined and sealed by the gasket.

A still further object is to provide a simple yet effective end bell engaging section for a pipe joining tool that comprises a semi-circular yoke having adjustable and pivoted lower dogs for engaging the end bell below its horizontal center line and having an adjustable and pivoted cam lever for engaging the top of the end bell to provide a secure three-point end bell engagement on the flange of the end bell as shown in in FIGURES 1 and 4.

And yet another object is to provide a simple and effective spigot engaging section for a pipe joining tool that comprises a yoke including a lever and having rachet-acting jaws that are individually adjustable to accommodate different pipe sizes.

An additional object is to provide a greatly simplified complete two section pipe joining tool that comprises two closely spaced sections that will engage and join pipe of a wide range of diameters and even the shortest length pipe used in those diameters.

Yet another object is to provide a tool having dimensions of such a magnitude that one section of the tool may engage an end bell of a pipe and the other section may engage an extremely short length of pipe, such as a 45° or 90° close elbow and join the short pipe to the end bell.

These and other objects and advantages will be apparent from an examination of the following specification and drawings in which:

FIGURE 1 is a side elevational view showing the improved tool assembly of this invention in its installed position relative to the pipe being joined.

FIGURE 2 is a front elevational view of the spigot gripping section of the tool assembly of FIGURE 1.

FIGURE 3A is an enlarged detail view of one embodiment of the spigot engaging jaw of the device of FIGURE 2.

FIGURE 3B is similar to 3A for another embodiment.

FIGURE 4 is a pictorial view of the end bell engaging section of the tool assembly of FIGURE 1.

FIGURE 5 is an enlarged detail view of the end bell engaging dog members of one embodiment of the end bell engaging section of FIGURE 4.

FIGURE 6 is a side elevational view showing the single section spigot engaging member being used to disassemble a pipe joint.

FIGURE 7 is an enlarged detail pictorial view of the combined pivot pin and separator lug used in the spigot engaging section of this invention.

FIGURE 8 is a detail front elevational view of an embodiment of an end bell engaging cam member assembly.

Referring now more particularly to the characters of reference on the drawing, it will be observed in FIGURES 1, 2 and 4, that the complete tool of this invention, identified at 2, is comprised basically of an end bell engaging section 3 and a spigot engaging section 4. Each section engages the identified pipe ends in close-coupled relation to each other and immediately adjacent a pipe joint, and force applying movement of the spigot section in one direction will "make" or assemble a pipe joint, whereas force applying movement of the spigot section in the other direction will "break" or disassemble the pipe joint.

The end bell engaging section 3 may best be observed in FIGURES 1 and 4, and it comprises a generally semi-circular relatively thin frame or yoke member 5 for surrounding, in closely spaced relation, an end bell E of a pipe joint to be made or broken. Near the lower ends of the yoke member, a pair of end bell engaging dogs 6 are pivotally located, and near the top center of the yoke member a single L-shaped cam member 7 is pivoted. A pair of projecting lugs 8 extend from the bottom edge of the member 5 a very short distance to provide a close coupled pivotal connection for the companion section 4 in a manner hereinafter described.

The spigot engaging section 4 is seen in its usual operating environment in FIGURES 1 and 2, and in a special operating environment in FIGURE 6. In FIGURE 2, the section 4 is seen to comprise a yoke member 10 having an upwardly extending handle or lever 11 and two downwardly projecting side arms 12. The yoke member 10 is generally circular in cross section except for the jaw supporting portion 13 and the depending pivot supporting housing 14. The jaw members 15 and pivot members 16 and set screws 17 are installed as functional operating parts of the yoke member 10 and thus complete the spigot engaging section 4.

The jaw members 15 are generally constructed as shown in FIGURE 3A, wherein the main body portion 20 includes a center cavity 21 comprised of three overlapping holes that provide a continuous intercommunication throughout the entire cavity area. One external end of the jaw member 15 has a series of jaw teeth 22 all sloping in the same direction. When the jaw member 15 is installed on the jaw supporting portion 13 as seen in FIGURES 3A and 3B, a selected one of the three holes, identified as 21a, 21b, and 21c, will pivotally engage the portion 13. Thus engaged, the jaw member 15 may pivot through an angle that exceeds the angular movement that the jaw members will encounter in normal operation. However when the jaw teeth 22 are not in contact with a pipe or spigot, the jaw member 15 may be rotated approximately 90° (clockwise in FIGURE 3) until the thin cross-section of portion 13 will pass through the opening between adjacent holes 21a, 21b, etc., and the jaw member 15 is then rotated back to its operating position in the new hole location. This, of course, permits the jaws to be adjusted progressively up or down to accommodate sizes of pipe. The position shown in FIGURE 3 would be the setting used for the largest size of pipe to be engaged. One advantage for the embodiment shown in FIGURE 3B is that the slot 23 in jaw member 15' permits the jaw member to be removed entirely for sharpening the teeth 22' or for replacing the jaw member with another jaw member for use with larger or smaller pipe sizes. While the use of three holes will permit the tool of this invention to be used on the pipe sizes normally encountered in construction work, the use of a jaw member with additional holes will permit the smallest pipe usuable in this type of installation to be engaged by the spigot section. A leaf spring 25 is attached to the portion 13 by a screw 26 in such a manner that the spring 25 normally engages a rail 27 at one edge of the jaw member 15 to bias the jaw member in a direction to cause the teeth 22 to tend to dig into the pipe or spigot S. Each of the pipe engaging sections 3 and 4, including yoke members 5 and 10, may be referred to as a "yoke means."

In FIGURE 5, and with reference to FIGURE 4, the details of the attachment and operation of the dog members 6 may be observed. The dog members 6 are generally elongated with an internal slot 30 and an offset end portion 31 having a pair of spaced apart lips 32 to surround the flange F of an end bell E in normal operating use. The lips, however, are serrated as at 33 for those special instances when it is desired to make or break threadless pipe that does not have an end bell. The underside of dog member 6 includes a series of ridges or indentations 34 that are separated by the proper dimension so that as the jaws are moved from one indentation to the next, the lips 32 will move the proper distance to engage the next pipe size. The dog members 6, as well as cam member 7, are held in place and yet permitted sliding or pivoting movement by shoulder type bolts 35 and 35', which are tightened securely in place (and may be peened if desired) in a threaded opening (not shown) in the frame member 5. A coil spring 36 is anchored in a slot 37 in bolt 35 adjacent each dog member 6, so that the spring 36 will normally urge the dog member into engagement with bolt 38. These lower or back-up bolts 38 are similar in construction to bolts 35, which may or may not include a knurled head as shown at 39 on bolts 38. The purpose of the knurled head on bolts 38 is to permit these bolts to be readily removed, so that dog members 6 may be pivoted downward (clockwise in FIGURE 5) to permit the yoke member 5 to be lifted straight up and off of an end bell when operating conditons so require.

When the end bell engaging section 3 is to be installed on an end bell of a pipe, usually in a trench underground, the dog members 6 are set to the proper size on the surface and the section 3 is lowered down over the spigot S or a portion of the pipe P away from the end bell E. At this point the lips 32 of the members 6 are substantially below the horizontal diameter of the pipe and the entire section 3 may be slid toward the end bell until the flat 40 between the lips 32 is in alignment with the flange F of end bell E. The section 3 is then raised vertically until the flat 40 engages the flange F. At this point the proper adjustment hole 41 (similar to holes 21a, b and c) engages the bolt 35' so that the cam member 7 may be forceably rotated (clockwise in FIGURE 4) by lever 42 to cause the cam surface 43 to forceably engage the top side of flange F and bind the end bell engaging section 3 into a three point locking engagement with its end bell E. The bolts 35' are similar to bolts 35, except they include a pair of flats in the same manner and for the same purpose as the flats on portion 13 in FIGURE 3. When the cam lever 42 is vertical, the proper hole 41 may be caused to engage bolt 35' to provide the desired three point engagement between the section 3 and the end bell. Since the functions of the dogs 6 and cam 7 cooperate to clamp the yoke section 3 to the flange F of end bell E, they may be referred to as a "clamping means" (see FIG. 4).

Once the end bell engaging section 3 is attached as described, the spigot engaging section 4 is installed by lowering over the spigot S in such a manner that its pivot pin 16 is in alignment with a vertically opening slot 44 in lug 8, as seen in FIGURE 1. Thus the pivot pin 16 and lug 8 cooperate (as seen in FIG. 1) to form the connecting means between the two pivotally connected yoke sections. At this point the entire yoke member 10 is free to pivot in either direction upon the application of an axial directed force to lever 11. However when the force is applied in the direction of arrow A, the jaw members 15 will grip the spigot S and carry it into the adjacent opening of end bell E, and compress a rubberlike gasket (not shown) between the outer diameter of spigot S and the inner diameter of the end bell E. After lever 11 has moved one stroke length (approximately to member 5) it is moved in the opposite direction, and the jaw members 15 slide along the spigot S until the direction of movement is changed. At this point the teeth 22 dig into the spigot and the process may be repeated until the spigot is fully engaged in and sealed with the end bell. This action of the jaws resembles a ratchet, since it operates in the desired direction and slips in the other direction. The jaws 15 and their supporting structure may thus be referred to as a "ratcheting means" (note FIGS. 1–3). By picking the section 4 straight up and rotating it 180°, the ratchet-like action will operate in a direction to remove spigot S from end bell E.

In some installations there may be a culvert C (FIG. 6) or over-hanging projection that prevents the use of section 3. Nevertheless, the spigot may be removed by using only the spigot engaging section 4 by the technique shown in FIGURE 6. In this application the jaw members 15 are made to engage the spigot S at a point very close to the flange F, so that upon movement of lever 11 in direction of arrow B, the right angle arm 50 of pivot member 16 applies an axial force to flange F which is considered stationary and spigot S moves in direction B and upon repeated ratchet-like movements of lever 11 (and jaw member 15) the spigot S is removed from the end bell. The pivot member 16 is seen in FIGURE 7 to contain a series of reference marks 51 to set the arm 50 at the proper radial location to accommodate a selected pipe size. The top flat section 52 of member 16 cooperates with a matching flat roof 53 of the opening in housing 14 to prevent the pivot member 16 from rotating in housing 14.

The tool described is usuable primarily on cast iron pipe which usually comes in 3, 4 and 5 inch nominal diameters for use in the construction trades. However with the jaw embodiment described relative to FIGURE 3B, virtually any size pipe from 5 inch downward to the lowest practical size may be fitted using this tool. And by extension of this principle, virtually any larger size pipe may also be assembled or disassembled. Further, this tool may be used also on composite pipe, or on plastic pipe, or on other pipe materials in present use.

The modified cam member assembly 54, shown in FIGURE 8, is useful in instances where the pipe or end bell is not perfectly round, or varies from its nominal size. In this arrangement the cam member 55 is seen to comprise an elongated lever with an elongated slot 56 which spans the three hole sizes shown in cam member 7 and beyond with virtually no limit of pipe sizes within the range normally used in construction work. The lower end member 57 includes a cam surface which engages an end bell. The lower end adjacent the cam surface also includes an overhanging lip 58 which engages the outer edge of the end bell flange to prevent slippage of the tool during operation thereof. A separate piece 60 is pivotally supported from the yoke member 5 by pivot bolt 61. The cam member 55 is slideably engaged in piece 60 and is retained therein by the enlarged head of pivot bolt 61. By this arrangement, the entire assembly 54 may be rotated about bolt 61 until the cam surface 57 touches the end bell and lip 58 overhangs the end bell flange. At this point the locking screw 62 is tightened until it binds the cam surface 57 against the end bell for a secure engagement. The lip 58 corresponds to a similar lip 58A on cam member 7 for the same purpose.

The rotary guard latch 65 of FIGURE 1 rotates about a bolt 66 engaged in lug 8. This latch may be manually opened to permit pivot member 16 to be inserted into slot 44, and then manually closed to prevent accidental removal of pivot member 16 during operation. The slight pressure required to close latch 65 holds it in place.

The pivot member 16 includes a series of detents 67 adjacent the indicator marks 51, so that the wing type set screws 17 will tighten onto and hold member 16 in place at the desired adjusted location.

It is to be understood that the above-described arrangements are illustrative of the application of the principles of the invention. Numerous other arrangements may be devised by those skilled in the art without departing from the spirit and scope of the inbention.

What is claimed is:

1. A pipe joining tool for selectively assembling and disassembling threadless joints of two adjacent pipes having a flanged end bell and spigot, respectively, comprising:
    (a) a first yoke section;
    (b) clamping means in said first yoke section comprising laterally slideable dogs for attaching directly onto and overlapping the flanged portion of said end bell and comprising a lever arm cam means for engaging the flanged portion after said dogs have been engaged and in a manner to bind said first yoke section rigidly to said flanged portion;
    (c) a second yoke section;
    (d) ratcheting means in said second yoke section comprising laterally adjustable toothed jaws for slideably and rigidly engaging said spigot, selectively;
    (e) connecting means for pivotally attaching said first and second yoke sections together in close-coupled relation immediately adjacent the adjacent ends of said two pipes; said connecting means comprising a pin on one yoke section and a short length lug defining a slot on the other yoke section;
    (f) a force applying lever in at least one yoke section for forceably pivoting said yoke sections for relative angular movement and for moving at least one of said pipes in a direction to forceably join said spigot and said end bell;
    (g) and reversing means including said connecting means, and including a releasable latch normally holding said pin in said slot, for permitting reversing of said at least one yoke section whereby said lever, upon 180° reversal of said at least one yoke section, is capable of moving at least one of said pipes in a direction to forceably separate a joint formed of said spigot and end bell.

2. A pipe joining tool for selectively assembling and disassembling threadless joints of two adjacent pipes having a flanged end bell and spigot, respectively, comprising:
    (a) a first yoke section;
    (b) clamping means in said first yoke section for attaching said section directly to the flanged portion of said end bell;
    (c) a second yoke section;
    (d) ratcheting means in said second yoke section for slideably and rigidly engaging said spigot, selectively;
    (e) connecting means for pivotally attaching said first and second yoke sections together in close-coupled relation immediately adjacent the adjacent ends of said two pipes;
    (f) and force applying means on at least one yoke section for forceably pivoting said yoke sections for relative angular movement and for moving at least one of said pipes in a direction to forceably join said spigot and said end bell;
    (g) and means for permitting reversing of said at least one yoke section whereby said force applying means is capable of moving at least one of said pipes in a direction to forceably separate a joint formed of said spigot and end bell.

3. A tool for assembly of threadless joints of two adjacent pipes having an end bell and a spigot, respectively, comprising:
    (a) a combined structure of at least two but less than three yoke means, comprising a first and second yoke means;
    (b) clamping means in said first yoke means for rigidly attaching said yoke means directly onto and over said end bell;
    (c) means in said second yoke means for engaging said spigot;
    (d) connecting means for pivotally attaching said first and second yoke means together in close-coupled relation immediately adjacent the location where the spigot of one pipe joins the end bell of the other pipe;
    (e) and means for forceably pivoting one yoke means at the location of its attachment to the other yoke means and causing relative angular movement between said yoke means to move the engaged spigot in a direction to forceably join said spigot with said end bell.

4. A pipe joining tool as in claim 3, wherein said clamping means comprises a cam and dogs in said yoke means and wherein said cam and dogs each include structure to overhang the free end of said end bell and thereby locate said first yoke means immediately adjacent the joint between said spigot and end bell.

References Cited

UNITED STATES PATENTS

| | | | |
|---|---|---|---|
| 630,900 | 8/1899 | Kohl | 269—165 X |
| 1,341,193 | 5/1920 | Owens | 81—412 X |
| 2,958,125 | 11/1960 | Nichols | 29—237 |
| 3,096,572 | 7/1963 | Simmons | 29—237 |
| 2,554,948 | 5/1951 | Kiefer | 81—3.32 |

JAMES L. JONES, JR., *Primary Examiner.*